United States Patent [19]
Wells

[11] 4,009,560
[45] Mar. 1, 1977

[54] WHEELED RAKING DEVICE

[76] Inventor: Edward H. Wells, 111 Mooring Buoy Road, Hilton Head Island, S.C. 29928

[22] Filed: Feb. 4, 1976

[21] Appl. No.: 655,127

[52] U.S. Cl. .............................. 56/400.01; 56/16.7
[51] Int. Cl.² ........................................ A01D 7/00
[58] Field of Search ......... 56/16.7, 400.01, 400.02, 56/400.03, 400.14, 384, 386, 391

[56] References Cited
UNITED STATES PATENTS

| | | | |
|---|---|---|---|
| 2,212,973 | 8/1940 | Arnold | 56/391 |
| 2,939,266 | 6/1960 | Hanes et al. | 56/400.02 |
| 3,417,554 | 12/1968 | Sudhoff | 56/16.7 |
| 3,777,460 | 12/1973 | Mokros | 56/16.7 |
| 3,824,773 | 7/1974 | Brubaker | 56/16.7 |

*Primary Examiner*—Russell R. Kinsey
*Attorney, Agent, or Firm*—Bailey, Dority & Flint

[57] ABSTRACT

The invention relates to wheeled raking machines which is rolled over the ground by a walking attendant. The raking device includes a raking head having a plurality of raking tines. The raking head is rocked back and forth to gather leaves ahead of the raking device. The rocking motion of the raking head is derived from a cam and linkage arrangement connected to the wheel. Thus, as the wheeled device is rolled over the ground the raking head is oscillated to rake the leaves.

14 Claims, 6 Drawing Figures

WHEELED RAKING DEVICE

BACKGROUND OF THE INVENTION

Raking leaves it often arduous and time consuming labor. Heretofore, devices have been developed for reducing the laborious task of hand raking by providing wheeled raking devices.

Power raking machines which utilize a gas or electric motor to drive a reciprocating rake head are shown in U.S. Pats. Nos. 3,777,460 and 3,417,554. These machines are often used for general lawn conditioning purposes such as removing thatch or dead grass from lawns. They require access to an external electrical hookup as well as extended lengths of extrical extension cord. The resulting machines are then rather heavy and inconvenient to use for raking loose lawn cover such as leaves. Power machines do not appear to be practical for such purposes.

Manual raking devices have been developed, such as shown in U.S. Pat. Nos. 2,329,708 and 1,020,228, wherein raking tines are supported by wheels. The devices may be rolled along the ground with the raking tines gathering leaves and the like in the path of the device. Such devices do not require an auxilliary power source. However, the raking tines are only moved over the ground and are not provided with a simulated raking action. Leaves can soon accumulate beneath the raking tines resulting in a dragging raking action which will not rake cleanly.

In U.S. Pat. No. 3,824,773, a wheeled power raking device is disclosed having a plurality of individual hand types rakes operated by a crankshaft. The crankshaft is powered by an electric motor to move the individual rakes through a raking motion over a ground. Again, the attendant inconveniences and dangers of having an auxiliary power source are necessary and appear to outweigh the practical advantages of such a device, except possibly for commercial application.

SUMMARY OF THE INVENTION

It has been found that a wheeled raking device can be provided for raking loose ground covering such as leaves comprising an elongated handle member and a shaft member carried by the handle member having at least one wheel member carried thereon.

A transverse shaft is rotatably carried across a lower end of the handle member and a plurality of raking tines is carried by the transverse shaft. A connection means is connected between the wheel member and the transverse shaft. The connection means imparts a rocking motion to the transverse shaft as the wheel member rolls along the ground surface. Thus, the raking tines oscillate in a raking motion to gather leaves as the device is rolled along the ground.

Therefore, an important object of the present invention is to provide a lightweight raking device having a plurality of raking tines which are manually operated in a raking motion.

Another important object of the present invention is to provide a wheeled raking device which is readily affordable and useable by a walking attendant for residential purposes.

Another important object of the present invention is to provide a lightweight raking device where all the power for driving the oscillating raking head is derived from the rolling of the device over the ground by a walking attendant.

Another important object of the present invention is to provide a wheeled raking device having a highly efficient cam and linkage arrangement connected between a frame supporting wheel and the oscillating raking head to simulate a raking motion.

BRIEF DESCRIPTION OF THE DRAWINGS

The construction designed to carry out the invention will be hereinafter described, together with other features thereof.

The invention will be more readily understood from a reading of the following specification and be reference to the accompanying drawings forming a part thereof, wherein an example of the invention is shown and wherein.

DESCRIPTION OF A PREFERRED EMBODIMENT

The invention relates to lawn raking apparatus for gathering loose ground cover such as leaves and grass clippings. In particular, the present invention relates to a wheeled device which may be manually rolled over a ground surface by a walking attendant. The rotation of the wheels is converted into a reciprocating motion by a cam linkage assembly for oscillating a raking head in a raking or sweeping motion.

Figure 1:
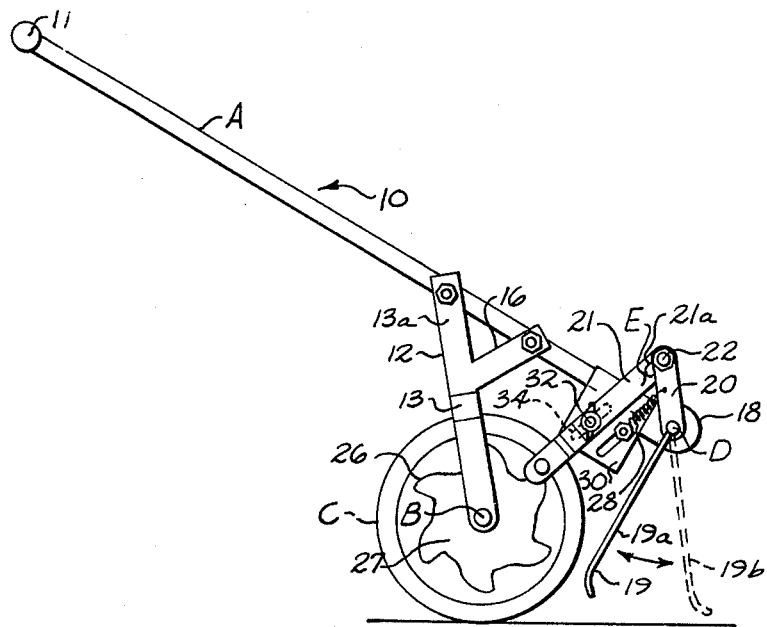
FIG. 1 is a side elevational view of a raking device constructed in accordance with the present invention.
Figure 2:
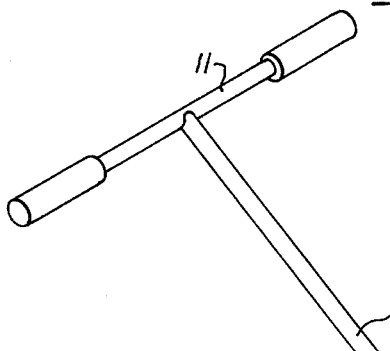
FIG. 2 is a perspective view further illustrating the embodiment of the present invention shown in FIG. 1.
Figure 2:
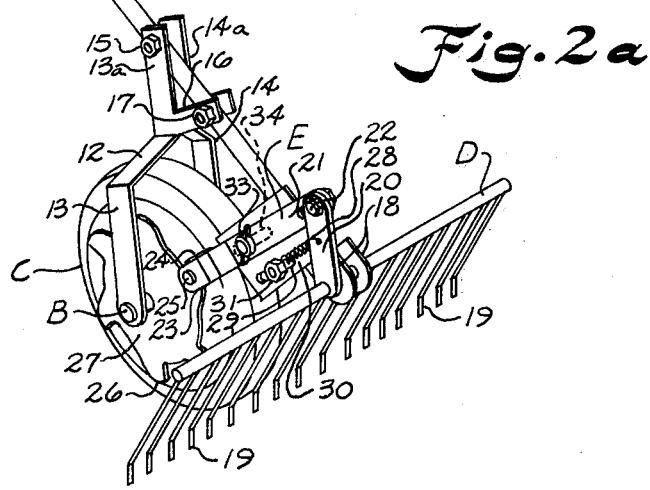

Referring in more detail to the drawings, FIGS. 1 and 2 illustrate a preferred embodiment of a lightweight raking device designated generally at 10. The raking device includes an elongated handle member A for moving and steering the device which is preferably a tubular member. The handle member A has an upper transverse handle grip portion 11 which may be gripped by a walking attendant. A first shaft member B is carried by the handle member A which serves as a drive shaft. A wheel member C is carried on the shaft member B and supports the handle member A above the ground.

The shaft member B and wheel member C are attached to the handle member A by a forked-shaped bracket member 12 having a pair of spaced forked legs 13 and 14 between which the shaft and wheel members are carried. Each forked leg 13 and 14 has an upper portion 13a and 14a, respectively, which is attached directly to the handle member A by any suitable means such as bolt 15. The bracket 12 is further secured to the handle A by a leg portion 16 extending outwardly from each leg 13a and 14a and connected to the handle member by bolt 17.

A transverse shaft D is rotatably carried in bearing plates 18 adjacent a lower end of the handle member A. The bearing plates are attached to the handle member by any suitable means such as welding. A plurality of raking tines 19 are carried by the transverse shaft D to define a raking head.

Connection means E is connected between the wheel member C and the transverse shaft D for transmitting and imparting a rocking motion to the shaft D to oscillate the tines 19 of the raking head. The connection means E includes a cam roller/linkage assembly having a first linkage arm 20 rigidly connected to the shaft D. A second linkage arm 21 is pivotably connected to arm 20 at pivot 22 in any suitable manner.

Linkage arm 21 includes a pair of fork arms 23 and 24 between a cam roller 25 is carried. The cam roller 25 bears against a cam surface 26 of a cam plate member 27. The cam plate 27 is carried by the first shaft B so as to rotate with the wheel member C. The cam member 27 and wheel C may both be affixed to shaft B for rotation therewith, or both may rotate relative to shaft B and be affixed to each other in any suitable manner.

Cam roller 25 is maintained in bearing engagement with cam surface 26 by means of a biasing force from spring 28. One end of spring 28 is attached to linkage arm 21 and the other end is adjustably positioned in a slot 29 in a plate 30 and secured therein by bolt 31. Plate 30 is attached to handle member A such as by welding. Linkage arm 21 is restrained to substantially reciprocal motion by guide bolt 32 which slides in guide slot 34 formed in plate 30 and is secured by nut 33. As the linkage 21 reciprocates, the linkage arm 20 moves in an angular motion to oscillate or rock the shaft D and thus raking tines 19 backwards and forward.

The individual cam surfaces 26 are shaped to include a relatively fast rise 36 from the low point 37 to the high point 38 of the cam, and a sudden, much faster drop from the high point 38 to the low point 37. The low point 37 further provides a dwell portion 39. This cam surface provides the following raking motion for the raking tines 19: (a) the tines are lifted as the cam roller 25 reaches the high point 38 of the cam to the position 19a, (b) the tines drop quickly to the position 19b as the roller drops from the high point 38 to the low point 37 of the cam under the biasing force of spring 28, and (c) the raking tines remain down in position 19b and drag through the grass momentarily as the roller dwells and rolls over the low point dwell portion 39 before again being lifted in (a).

Of course, the duration of each of the above three phases of the raking motion may be selected and varied by altering the shape of cam surface 26 to provide the optimum raking motion. In some applications, it may be desired to eliminate the drag phase or phase (c) of the raking motion by eliminating the dwell portion 39. This would provide a substantially constant rocking motion of the raking tines backwards and forwards without any dwell or drag through the grass. The cam surface 26 would include a rise portion 36 which begins immediately after the drop from high point 38 of the cam.

Thus, as wheel member C rolls over the ground surface, raking tines 19 oscillate in a raking motion by connection means E including cam member 27 to gather leaves or any other loose lawn covering such as grass clippings.

Figure 3:
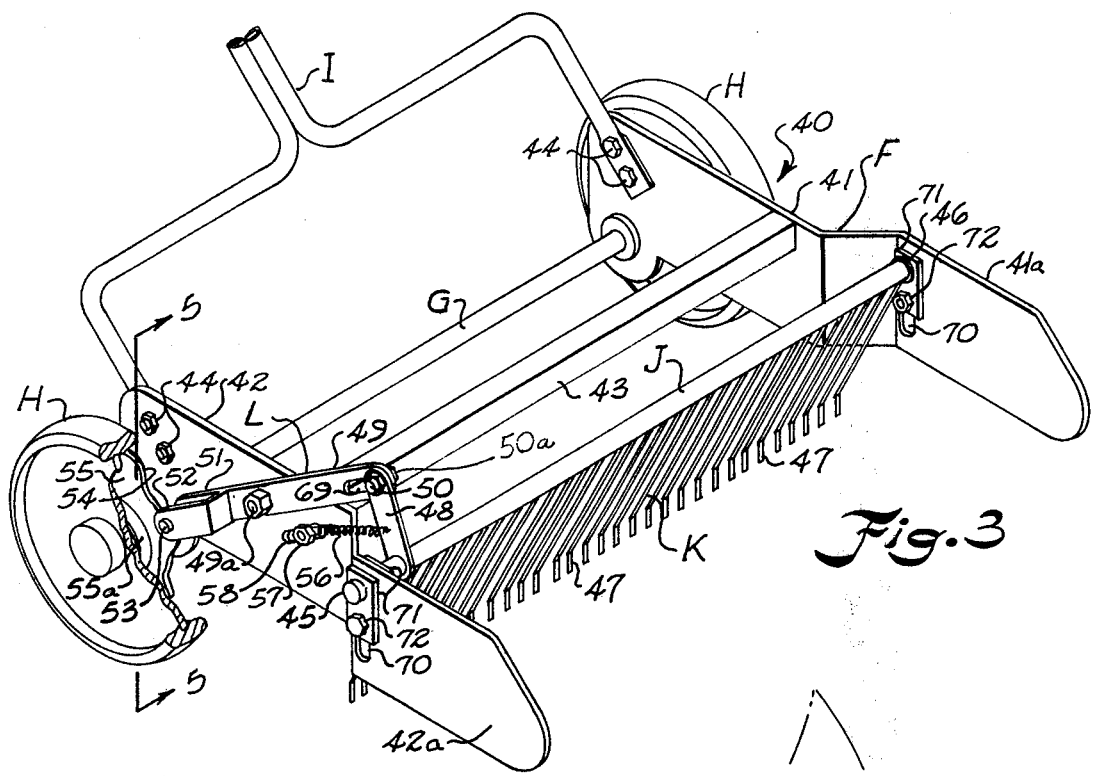
FIG. 3 is a prespective view illustrating another embodiment of a raking device constructed in accordance with the present invention.

Referring now to FIG. 3, an embodiment of a two-wheel raking device constructed in accordance with the present invention is illustrated generally at 40. The raking device includes a frame F having a pair of opposing side frames 41 and 42 and a spacing bar 43 extending therebetween. The bar 43 may be attached to sides 41 and 41 such as by welding. A first shaft G is carried by the frame F extending through the side frames 41 and 42. A pair of wheel members H is carried on remote ends of the shaft G supporting the frame F above the ground. The side frames are flared slightly outwardly to provide a pair of side frame portions 41a and 42a which are offset outwardly. This results in the wheels H having a narrower gauge than the frame portions 41a and 42a so that the raking device may roll closer to shrubs, fencing, buildings, and the like.

A handle member I is attached to the rear of the frame F at each side 41 and 42 by means of bolts 44. The handle I is preferably tubular and of the type which may be folded for storage.

A transverse shaft J is carried by the frame F and extends through rotation bearing openings 45 and 46 carried by the side frames 41 and 42, respectively. A raking head K is defined by a plurality of raking tines 47 carried by the transverse shaft J and attached thereto in any suitable manner.

A connection means L is connected between one of the wheels H and the transverse shaft J for imparting and transmitting a rocking motion to the transverse shaft. The rocking of the shaft J oscillates the raking head K to simulate a raking motion as the wheel members H roll over the ground. The loose ground coverings, such as leaves, are gathered together ahead of the raking device 40 by the raking motion.

The connection means L includes a cam roller/linkage assembly having a first linkage arm 48 connected to the transverse shaft J in a fixed manner and a second linkage arm 49 pivotably connected to linkage arm 48 at 50. The remote end of linkage arm 49 includes a pair of spaced fork arms 51 and 52 between which a cam roller 53 is rotatably carried. The linkage arm 49 is restrained to substantially reciprocal motion by guide pin 49a which slides in guide slot 49b formed in side frame 42.

The cam roller 53 bears against a cam surface 54 of a cam plate member 55 under a biasing force provided by a spring element 56. The biasing force may be adjusted by loosening a nut and bolt arrangement 57 which secures one end of the spring 56 in an open slot 58. The secured end of the spring 56 may then be slideably positioned in the slot 58 so as to adjust the biasing force provided by the spring. It is noted that the fork arms 51 an 52 extend past and over the sides of the cam surface 54 to aid in maintaining the cam roller 53 in contact with the cam surface 54.

The connection means further includes an engagement means connected between one of the wheels H and the cam member 55 for rotating the cam member in synchronization with the wheel member in a forward or clockwise direction only. The engagement means preferably includes a ratchet/pawl arrangement having pawl 59 pivotably attached to drive plate 60 at 61. A spring member 62 is attached to one end of pawl 59 and to the plate 60 biasing the pawl in a counter-clockwise direction so as to engage in a recess slot 63 formed in an interior surface 64 of a flange sleeve 55a of the cam member 55.

The drive plate 60 is received and fitted within the interior surface 64 of the cam sleeve 55a. The drive plate 60 may rotate with the shaft G or may be attached to rotate with the wheel H in case the wheel rotates on the shaft G rather than with it. In either case, as the drive plate 60 is rotated in the forward or clockwise direction, the pawl 59 is engaged within recess 63 to rotate cam member 55 accordingly. However, cam member 55 will not be rotated by the drive plate 60 in the reverse direction.

Figure 2A:
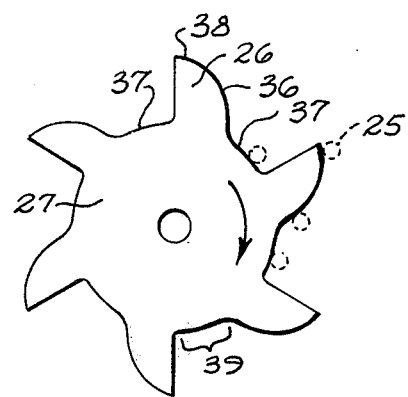
FIG. 2a is a side elevational view of a cam plate member for use with a raking device constructed in accordance with the present invention.

The individual cam surfaces 54 are shaped in the same manner as the cam surfaces shown in FIG. 2a. The cam surfaces 54 include a relatively fast rise 65 from a low point 66 to a high point 67 of the cam, and a sudden, much faster drop from the high point 67 to the low point 66. The low point 66 further provides a dwell portion 68. The cam surfaces provides the following raking motion for the raking head K: (a) the tines 47 are lifted as the cam roller 53 reaches the high point 67 of the cam to a position 47a, (b) the tines drop quickly to a position 47b as the roller drops from the high point 67 to the low point 66 of the cam under the biasing force of spring 56 and (c) the raking tines remain in position 47b and drag through the grass momentarily as the roller dwells and rolls over the low point dwell portion 68 prior to being lifted again as in (a).

The duration of each of the above three phases of the raking motion may be selected and varied by altering the number and shape of cam surface 54 to provide the desired raking motion. In some applications, it may be desired to eliminate the drag phase or phase (c) of the raking motion by eliminating the dwell portion 68. This would provide a substantially constant rocking motion of the raking tines backwards and forwards without any dwell or drag in the grass.

It may be desirable in some applications to have the raking head merely drag through the grass to rake the lawn covering without oscillating. To this end, the guide pin 49a may be a threaded stud whereby a nut 49c may be threadably received over a threaded end extending through the guide slot 49b to provide a lock means for linkage 49. Thus, the linkage arm 49 may be moved forward out of engagement with cam plate 55 and locked into place in the guide slot 49b by tightening the nut. However, this will raise the raking tines 47 out of raking position relative to the ground. To alleviate this, the pivot point 50 of linkage 48 may then be allowed to retract to the rear of a slot 69 provided in linkage 49 under the force of spring 56 by loosening the nut member 50a. This permits the raking tines 47 to drop downwardly to assume a proper raking position adjacent the ground for drag raking. This expedient may also be provided in the embodiment of raking devices 10 shown in FIG. 1 by the analogous elements slot 34, nut 33, guide bolt 32 and slot 21a with cooperating pivot belt 22.

Figure 4:
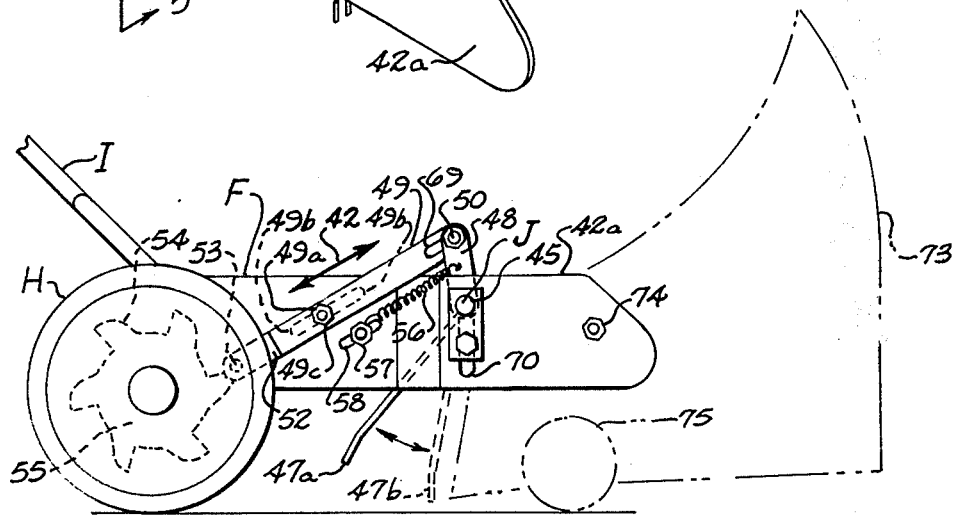
FIG. 4 is a side elevational view of the embodiment shown in FIG. 3.
Figure 5:
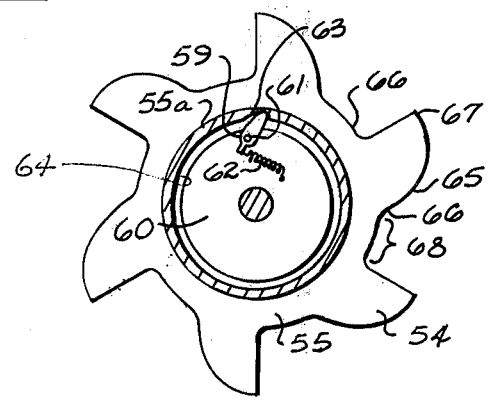
FIG. 5 is a sectional view taken along line 5—5 of FIG. 3 illustrating a cam plate member for use with the embodiment of FIGS. 3 and 4 as constructed in accordance with the present invention.

It is to be understood, of course, that in normal operation, the pivot 50 would be locked by nut 50a in the far end of the slot 69 as shown in FIGS. 3 and 4 and linkage arm 49 would be freed by loosening lock nut 49c permitting oscillation of the raking head.

Further adjustment of the position of the raking tines relative to the ground is provided for all operations of the raking device 40 by carrying the shaft J in a vertical slot 70 provided in each side frame 41 and 42. This may be advantageous when front wheels are used on the raking device. A pair of plates 71 are provided on sides of each slot 70 and are positionable along the height of the slot by loosening bolt members 72. The bearings 45 and 46 are then provided in the washer plates 71.

It may also be desirable to provide a front loading leaf or ground covering catching device shown at 73 in phantom lines in FIG. 4. In which event, attachment to the raking device 40 may be made at 74 in any suitable manner. The catching device may be of any suitable configuration and preferably includes rollers 75. The accumulation of leaves may be pushed into the catching device 70 by action of the raking tines 47 or auxiliary means may be provided for doing such. A fixed raking head (not shown) may be mounted across shaft member G or carried adjacent thereto in any suitable manner across the rear of the raking device to catch and accumulate any leaves missed by the raking head K.

To reduce the tendency of the wheel members H to skid under possibly heavy loads, the wheels may be provided with cleats. Other suitable alternatives may be utilized to accomplish the same such as spikes or studs extending outwardly from the wheels.

Front wheels may be necessary in some applications and as an alternative, conventional skids may be utilized on the front.

Thus, an advantageous construction of a manual, wheeled raking device can be had in accordance with the present invention. The device is lightweight and requires no external power source to oscillate the raking head. The device is readily affordable and useable by a walking attendant for residential purposes. The device may be used to rake or gather all forms of loose lawn coverings such as leaves, grass clipping, and the like.

A highly efficient cam and linkage arrangement is provided to convert the rotation of the wheels into an oscillating motion for moving the raking head in a preferred raking motion. However, it is to be understood, that other arrangements and mechanisms for providing such motion may also be utilized.

While a preferred embodiment of the invention has been described using specific terms, such description is for illustrative purposes only, and it is to be understood that changes and variations may be made without departing from the spirit or scope of the following claims.

What is claimed is:

1. A wheeled raking device comprising:
   a. an elongated handle member for moving and steering said device;
   b. a first shaft member carried by said handle member;
   c. at least one wheel member carried on said first shaft member supporting said handle member above the ground;
   d. a transverse shaft rotatably carried across a lower end of said handle member;
   e. a raking head having a plurality of raking tines carried by said transverse shaft;
   f. connection means connected between said wheel member and said transverse shaft; and
   g. said connection means imparting a rocking motion to said transverse shaft to oscillate said raking head in a raking motion as said wheel member rolls along the ground surface;
   whereby said raking tines move in a raking motion to gather leaves and the like as said device is rolled along the ground.

2. The device set forth in claim 1 wherein said connection means comprising:
   a cam member carried by said first shaft for rotation with said wheel member, said cam member having a cam surface for effecting said raking motion;

a cam roller in bearing engagement with said cam member for following said cam surface; and linkage means connecting said cam roller to said transverse shaft to impart said oscillating motion to said raking tines carried thereon.

3. The device set forth in claim 2 wherein said cam member includes a plurality of cam surfaces having a fast rise a substantially faster drop and a dwell portion over which said cam roller follows.

4. The device as set forth in claim 1 wherein said raking motion includes a sudden lift of said raking tines, a more sudden drop of said tines, and a momentary dwell of said tines in said dropped position as said tines drag through the grass.

5. The device set forth in claim 2 further including adjustable tensioning means resiliently urging said cam roller against said cam surface.

6. A wheeled raking device comprising:
   a. a frame;
   b. a first shaft carried by said frame;
   c. a pair of spaced wheel members carried on said first shaft spacing said frame above the ground;
   d. handle means extending upwardly from said frame for exerting a moving force on said frame;
   e. a transverse shaft rotatably carried by said frame;
   f. a raking head defined by a plurality of raking tines carried by said transverse shaft; and
   g. connection means connected between one of said wheel members and said transverse shaft for rocking said transverse shaft to oscillate said raking head in a raking motion as said wheel members roll over the ground;
   whereby leaves and the like adjacent said raking head are gathered together ahead of said raking device by said raking motion.

7. The device set forth in claim 6 wherein said connection means comprises:
   a. a cam member having a cam surface for effecting said rocking motion carried on said first shaft for rotation with said wheel members;
   b. a cam roller in bearing engagement with said cam surface; and
   c. linkage means connecting said cam roller to said transverse shaft;
   whereby rolling of said device on said wheel members causes said transverse shaft and raking tines carried thereon to oscillate.

8. The device of claim 6 wherein said connection means comprises:
   a. a cam member carried on said first shaft;
   b. engagement means connected between said one wheel member and said cam member engaging said cam member for rotation with said wheel member in a forward direction only; and
   c. a cam follower linkage assembly connected between said cam member and said transverse shaft to impart said rocking motion thereto.

9. The device set forth in claim 6 wherein said connecting means includes engagement means for effecting oscillation of said racking head as said wheel members rotate in a first direction while permitting said raking head to remain idle when said wheel members rotate in a reverse direction.

10. The device set forth in claim 6 further including lock means for locking said connection means out of position to eliminate oscillation of said raking head whereby said raking head remains stationary as it drags through the lawn covering.

11. The device of claim 6 wherein the position of said raking head is adjustable vertically in said frame to adjust the position of said raking tines relative to the ground.

12. The device as set forth in claim 6 wherein said connecting means includes a cam member operatively connected with said wheel member and a cam roller/linkage assembly in cam following arrangement with said cam member for transmitting said raking motion to said raking head, said raking motion including a sudden lift of said raking head, a more sudden drop of said raking head, and a momentary dwell of said raking head as said head drags through the grass.

13. A wheeled raking device comprising:
   a. a frame having a handle member for exerting a force to move said frame;
   b. a first shaft carried by said frame having at lease one wheel member carried thereon spacing said frame above the ground;
   c. a raking head defined by a plurality of raking tines carried by a transverse shaft extending across said frame and rotatably carried therein;
   d. connection means connected between one of said wheel members and said transverse shaft for imparting a raking motion to said transverse shaft and said raking head as said wheel members roll over the gound;
   e. said connecting means including a cam member operatively connected with one said wheel member and a cam roller/linkage assembly in cam following arrangement with said cam member as said cam member rotates with said wheel member to transmit said racking motion to said raking head; and
   f. said raking motion including a sudden lift of said raking head, a more sudden drop of said head, and a momentary dwell of said raking head as said head drops momentarily in the grass prior to lifting again;
   whereby leaves and the likee adjacent said raking head are gathered together ahead of said raking device by said raking motion.

14. The wheeled raking device of claim 6 further comprising a collection device carried by said device adjacent said raking head for receiving and containing said gathered leaves and the like.

* * * * *